United States Patent [19]
Anand

[11] Patent Number: 5,872,173
[45] Date of Patent: *Feb. 16, 1999

[54] SYNTHETIC LATEX COMPOSITIONS AND ARTICLES PRODUCED THEREFROM

[75] Inventor: Joginder N. Anand, Naperville, Ill.

[73] Assignee: Cabot Corporation, Boston, Mass.

[*] Notice: This patent issued on a continued prosecution application filed under 37 CFR 1.53(d), and is subject to the twenty year patent term provisions of 35 U.S.C. 154(a)(2).

[21] Appl. No.: 627,158

[22] Filed: Apr. 3, 1996

[51] Int. Cl.$^6$ .............................. C08K 3/36; C08L 11/02
[52] U.S. Cl. .................... 524/494; 524/493; 524/527; 523/334; 523/335
[58] Field of Search .................... 524/494, 493, 524/527; 523/334, 335

[56] References Cited

U.S. PATENT DOCUMENTS

| | | | |
|---|---|---|---|
| 3,774,885 | 11/1973 | Logvinenko et al. | 259/1 |
| 4,274,883 | 6/1981 | Lumbeck et al. | 106/308 |
| 5,017,630 | 5/1991 | Raines et al. | 523/334 |
| 5,104,735 | 4/1992 | Cioffi et al. | 524/493 |
| 5,124,384 | 6/1992 | Goldstein | 524/169 |

FOREIGN PATENT DOCUMENTS

| | | | |
|---|---|---|---|
| WO96/19531 | 6/1996 | European Pat. Off. | C08L 7/02 |
| WO97/13805 | 4/1997 | European Pat. Off. | C08K 3/36 |

OTHER PUBLICATIONS

Degussa, A.G. Technical Bulletin Pigments, No. 33, entitled, "Aqueous AEROSIL® and Aluminum Oxide Dispersions," dated 1982.

Cabot Corporation, CGen–6, entitled, "CAB–O–SIL®. How to Use it, Where to Use it," dated 1968.

Godfrey L. Cabot, Inc., No. CRub–1, (formerly No. CMis–1) entitled, "CAB–O–SIL in the Rubber Industry," dated Jan., 1995.

Godfrey L. Cabot, Inc. entitled, "aerosil," vol. 6, No. 5, dated Feb., 1953.

Cabot Corporation, CGen–2, entitled, "Cab–O–Sil®, The Dry Process Silica," not dated.

Cabot Corporation, CGen–8, entitled, "CAB–O–SIL® Fumed Silica, Properties and Functions," dated Jun. 1987.

Cabot Corporation, Technical Service Laboratory Report, CRub–3, entitled, "CAB–O–SIL® in Dipped Latex Films," dated Aug., 1959.

Cabot Corporation, "CAB–O–SPERSE® Aqueous Fumed Silica Dispersions," dated 1986.

Godfrey L. Cabot, Inc., No. CRub–2, entitled, "CAB–O–SIL in Butyl Rubber," dated Feb., 1956.

Japanese Patent Abstract, Publication No. 06256718, dated Sep. 13, 1994, entitled "Polychloroprene Latex Composition".

*Primary Examiner*—Vasu Jagannathan
*Assistant Examiner*—Olga Asinovsky

[57] ABSTRACT

Synthetic latex compositions and articles produced therefrom having improved tear strength while minimizing the effect on modulus. The compositions include a synthetic rubber latex and fumed silica typically present in an amount ranging between 0.5% and 5.0% by weight of rubber solids. In a preferred embodiment, the fumed silica is introduced into the synthetic rubber latex as an aqueous dispersion of fumed silica.

39 Claims, No Drawings

SYNTHETIC LATEX COMPOSITIONS AND ARTICLES PRODUCED THEREFROM

BACKGROUND OF INVENTION

1. Field of Invention.

The present invention relates to synthetic latex compositions and latex films produced therefrom.

2. Description of the Related Art.

Natural rubber latex is commonly used in a wide variety of applications including films made by conventional dipping, coagulant dipping with bivalent salt or acid, and heat sensitive dipping. Films made from natural rubber latex are strong, flexible and are unlikely to sag during normal use. However, natural rubber produced articles are not always preferred or desirable under all circumstances. For example, films of natural rubber may be damaged by exposure to many solvents and petroleum-based fuels. In addition, natural rubber articles may be damaged by the action of light, heat and ozone. As a result, synthetic latex is often used and desired in various goods including, for example surgical gloves, examination gloves, protective gloves such as household gloves and electrostatic discharge conductive gloves, catheters, condoms, weather balloons, toy balloons, foamed products such as mattresses and pillows, and numerous other products. The goods may be produced wholly by the synthetic latex itself or may include a layer or coating of a synthetic latex on a natural rubber base. Commonly available synthetic latexes include: nitrile rubber; polychloroprene (also referred to as neoprene); butyl rubber; fluorocarbon rubber; polyurethane; styrene-butadiene rubber (SBR); and blends of nitrile, polychloroprene, butyl rubber, fluorocarbon rubber, polyurethane, styrene-butadiene rubber.

In spite of all the synthetic latexes commercially available, most synthetic latexes do not possess all the desirable characteristics of natural rubber such as low initial modulus, high tensile strength and high elongation. In addition, films produced from synthetic latex do not typically develop as much strength early in the drying process. This high wet-gel strength is critical in a coagulated dipping process. Similarly, articles made from synthetic latex tend to be deficient in tear strength. Therefore, tears tend to be prevalent in films and result from a number of activities, including removal of an article from its form (known as "hot" tears), tears on donning, and tears during contact with sharp objects during use by the wearer.

A need therefore remains for synthetic latexes with improved compositions and viscosity control, as well as films or coatings produced therefrom having enhanced mechanical and physical properties. In particular, a need exists for films and articles having increased tear strength while minimizing the detrimental effect on modulus, elongation and tensile strength. In addition, it is desired to retain the physical properties and tear strength upon ageing of these films and articles.

SUMMARY OF THE INVENTION

The present invention is directed to synthetic latex compositions comprising synthetic latexes and fumed silica. In a preferred embodiment, the fumed silica is incorporated into the latex composition as an aqueous dispersion of fumed silica and is typically present in an amount ranging between 0.5% and 5.0% by weight of rubber solids. The synthetic latexes expected to benefit from the addition of the aqueous dispersion of fumed silica include nitrile rubber; polychloroprene; butyl rubber; fluorocarbon rubber, polyurethane latex, styrene-butadiene rubber and blends thereof. The synthetic latex compositions of the present invention may be used individually or as a coating or layer in combination with natural rubber latexes.

Also disclosed is a synthetic latex article which includes the synthetic latex composition of the present invention.

DETAILED DESCRIPTION OF THE INVENTION

The present invention is directed to synthetic latex compositions and films produced therefrom having improved mechanical and physical properties. The synthetic latex compositions include a synthetic latex and fumed silica.

Suitable synthetic latexes of the present invention include those which are commercially available for use in a variety of latex applications and include nitrile rubber; polychloroprene; butyl rubber; fluorocarbon rubber, polyurethane latex, styrene-butadiene latex, and blends thereof, individually or in combination with natural rubber latexes. Typically, the synthetic latex has a total rubber solids content between about 25% and about 70%.

The production of fumed silica is a well-documented process which involves the hydrolysis of silicon tetrachloride vapor in a flame of hydrogen and oxygen. Molten particles of roughly spherical shapes are formed in the combustion process, the diameters of which are varied through process parameters. These molten spheres of fumed silica, typically referred to as primary particles, fuse with one another by undergoing collisions at their contact points to form branched, three dimensional chain-like aggregates. The force necessary to break aggregates is considerable and often considered irreversible because of the fusion. During cooling and collecting, the aggregates undergo further collision that may result in some mechanical entanglement to form agglomerates. Compared to the aggregates where the primary particles are fused together, agglomerates are thought to be loosely held together by Van der Waals forces and can be reversed, i.e. de-agglomerated, by proper dispersion in suitable media.

The size of the spherical primary particles that comprise the fumed silica aggregates determine the surface area. The surface area of the fumed silica, as measured by the nitrogen adsorption method of S. Brunauer, P. H. Emmet, and I. Teller, J. Am. Chemical Society, Volume 60, Page 309 (1938) and commonly referred to as BET, typically ranges from about 40 $m^2/g$ to about 430 $m^2/g$. In the present invention, the fumed silica is preferably in a range from about 50 $m^2/g$ to about 400 $m^2/g$ and should be of a high purity. High purity means that the total impurity content is typically less than 1% and preferably less than 0.01% (i. e. 100 ppm).

In a preferred embodiment, the fumed silica is incorporated into the synthetic latex composition as an aqueous dispersion of fumed silica, which dispersion typically ranges from about 10% to about 45% solids and preferably between 12% and 30% solids. The aqueous dispersions of fumed silica may be prepared by uniformly dispersing the fumed silica in a stable aqueous medium (e.g. deionized water) using conventional methods known to those skilled in the art. By uniformly dispersed is meant that the aggregates are isolated and well distributed throughout the medium. By stable is typically meant that the aggregates will not re-agglomerate and settle out (e.g. form a hard, dense sediment). The fumed silica dispersion typically has a pH between 5.0 and 10.5 and may be adjusted by the addition of a suitable base such as sodium hydroxide, potassium hydroxide, ammonia and the like. Preferably, the fumed silica dispersion of the present invention is prepared by the method described in U. S. Pat. No. 5,246,624 to Miller et al., the disclosure of which is incorporated herein in its entirety by reference, has a pH ranging between 8.0 and 10.0 and has coagulation characteristics similar to that of the synthetic rubber latex. A preferred aqueous dispersion of fumed silica is available under the name CAB-O-SPERSE® (a registered trademark of Cabot Corporation, Boston, Mass.).

In addition, it may be desired to filter the aqueous dispersion of fumed silica to remove any agglomerates which can cause pin holes and act as stress points in a final article. The dispersion may be filtered utilizing conventionally available filters, individual, or through a series of filters, preferably in a sequential order. For instance, the dispersion may be passed through a first 5.0 micron filter, and then through a 1.0 micron filter. It has been found that passing the dispersion through a 5.0 micron filter has provided a well-distributed, uniform distribution of the fumed silica in the dispersion. Preferably, the filter size is less than 5.0 microns, more preferably, less than 1.0 micron, and most preferably, less than 0.5 micron.

The aqueous dispersion of fumed silica may further include a sufficient amount of surfactant, depending on the end product application, to act as mechanical and chemical stabilizers in the synthetic latex system. The particular type of surfactant used will vary depending on the colloidal system of the latex itself. For example, anionic surfactants such as salts of alcohol sulfates are known to be useful as mechanical stabilizers and wetting agents in many anionic latexes, such as polychloroprene latex systems. Cationic latexes, on the hand, typically require cationic or non-ionic surfactants such as quaternary ammonium salts. In one embodiment of the present invention, the aqueous dispersion of fumed silica containing a sufficient amount of an anionic surfactant, such as DARVAN® WAQ or DARVAN® SMO surfactant (DARVAN is a registered trademark of Vanderbilt Company, R. T., Inc.), was found particularly useful to lower the viscosity of the synthetic latex composition to the desired level. Preferably, the surfactant is in an amount ranging between about 0.05% to about 0.5%.

The synthetic latex compositions of the present invention may be prepared by combining or mixing fumed silica or the aqueous dispersions of fumed silica with the synthetic latex and other desirable additives under low shear conditions (i.e. to prevent foaming) until a uniform homogeneous composition is obtained.

In order to maintain the colloidal stability and processability of the latex, it is desired that the loading level of the fumed silica, as a function of rubber solids, range from about 0.5 part to about 5.0 parts per hundred part by weight rubber solids (phr) in the synthetic latex. This level has been found to be effective to increase the tear strength without experiencing significant detrimental effects on modulus and viscosity of the composition. In addition, the compositions and films produced therefrom generally experience improved or enhanced elongation and tensile and, furthermore, a higher retention of tensile strength and comparable retention of elongation at break upon ageing. At loading levels below 0.5 phr in the synthetic latex, acceptable improvements in tear strength were not achieved. At levels above 5.0 phr, the fumed silica may have a harmful effect on the viscosity of the composition and the modulus. In a preferred embodiment, the loading level of fumed silica has been found to be about 1.0 part to 3.0 part per 100 parts by weight rubber solids in the synthetic latex.

Suitable additives are generally incorporated into the synthetic rubber latex compositions to impart a number of desired properties to the finished end product. Such additives are well known in the art and include curing, cross-linking or vulcanizing agents, vulcanization activators and accelerators, antioxidants, antidegradants, stabilizers, fillers, plasticizers, colorants, surfactants, wetting agents and the like. The amount of a particular additive will vary depending on the characteristics of the latex, the rubber solids content and properties desired. In addition, although prevulcanized synthetic latex may be used, most formulations generally consist of post-vulcanized synthetic latex depending of the end product application.

The synthetic latex compositions containing fumed silica or dispersions thereof at the levels described herein can be used to produce a variety of latex goods with enhanced physical and mechanical properties. For example, the synthetic latex compositions of the present invention is typically suited for thin film applications and may be used to produce gloves and condoms using conventional techniques such as straight dipping, coagulant dipping and heat sensitive dipping. In such applications, the films have demonstrated a significant improvement with tear strength and with minimal impact on modulus and other physical properties. In addition, blends such as SBR in combination with natural rubber are expected to experience similar improvement in tear strength. Non-limiting illustrations of the present invention follow.

EXAMPLE 1

Polychloroprene synthetic rubber latexes were prepared by lightly stirring the components listed in Table I. Sample 1 served as the control.

TABLE I

|  | SAMPLE | | | | | | |
|---|---|---|---|---|---|---|---|
|  | 1 | 2 | 3 | 4 | 5 | 6 | 7 |
| 60%, Baypren T polychloroprene latex[Y] | 167 | 167 | 167 | 167 | 167 | 167 | 167 |
| 10% casein | 2 | 2 | 2 | 2 | 2 | 2 | 2 |
| 50% sulfur | 2 | 2 | 2 | 2 | 2 | 2 | 2 |
| 45% sodium dibutyl dithiocarbamate | 2 | 2 | 2 | 2 | 2 | 2 | 2 |
| 50% zinc oxide | 10 | 10 | 10 | 10 | 10 | 10 | 10 |
| 50% 224d antioxidant* | 2 | 2 | 2 | 2 | 2 | 2 | 2 |
| 33% tetraethylthiuram disulfide | 3 | 3 | 3 | 3 | 3 | 3 | 3 |
| 17% aqueous dispersion of fumed silica (380 m²/g) | — | 2 | 2 | — | — | — | — |
| 17% aqueous dispersion of fumed silica (325 m²/g) | — | — | — | 2 | 2 | — | — |
| 17% aqueous dispersion of fumed silica (200 m²/g) | — | — | — | — | — | 2 | 2 |

[Y]Available from Bayer Aktiengesellschaft, Germany
*An o-methylene-bis-phenol antioxidant Before incorporation into the synthetic latex, the aqueous dispersions of fumed silica (having surface areas indicated in Table I) of samples 2, 4 and 6 were passed through a 5 micron bag filter (available from Bebco, Inc. of Joliet, Ill.) while the aqueous dispersions of fumed silica of samples 3, 5 and 7 were passed through a 1 micron bag filter (available from Bebco, Inc. of Joliet, Ill.).

Coagulant dipped films of approximately 0.3 mm thickness were prepared by immersing a warmed glass former into a coagulant solution consisting of 40% calcium nitrate in industrial methylated spirit and dipping into the latex mixture for 30 seconds. The latex film deposited on the form were dried at 70° C. for 1 hour and then cured at 120° C. for 20 minutes. The film was finally cooled, stripped from the form, and tested for physical properties. Tensile, aged tensile and tear (trouser's) strength properties were determined using ISO 37 (1977), ISO 188 (1982) and ISO 34 (1979) techniques, respectively and are illustrated in Tables II and III. Trouser tear is used in industry to closely simulate the actual tears observed in practice. Table IV shows the effect of fumed silica on the viscosity of the synthetic latex which was determined by Brookfield LVT viscosity measurements taken from one to seven days using a No. 2 spindle at 12 rpm, 21° C.

TABLE II

SYNTHETIC LATEX FILMS

| | Surface Area ($m^2/g$) | M300† (MPa) | M500‡ (MPa) | TS□ (MPa) | EB* (%) | Tear Strength (N/mm) |
|---|---|---|---|---|---|---|
| 1 (Control) | — | 1.08 | 1.60 | 18.7 | 1304 | 7.8 |
| 2 | 380 | 1.31 | 2.16 | 15.9 | 1147 | 10.0 |
| 3 | 380 | 1.15 | 1.90 | 19.5 | 1311 | 9.0 |
| 4 | 325 | 0.95 | 1.45 | 15.3 | 1291 | 9.1 |
| 5 | 325 | 1.25 | 2.00 | 12.4 | 1049 | 9.4 |
| 6 | 200 | 1.10 | 1.76 | 19.2 | 1342 | 9.4 |
| 7 | 200 | 1.11 | 1.83 | 20.2 | 1344 | 8.7 |

†Modulus at 300% Elongation
‡Modulus at 500% Elongation
□Tensile Strength
*Elongation at Break

TABLE III

AGED (2 days at 100° C.)

| | Surface Area ($m^2/g$) | M300† (MPa) | M500‡ (MPa) | TS□ (MPa) | EB* (%) | Tear Strength (N/mm) |
|---|---|---|---|---|---|---|
| 1 (Control) | — | 1.30 | 2.23 | 23.7 | 794 | 5.8 |
| 2 | 380 | 1.38 | 2.41 | 33.6 | 913 | 9.2 |
| 3 | 380 | 1.32 | 2.35 | 28.4 | 902 | 9.7 |
| 4 | 325 | 1.38 | 2.55 | 39.6 | 959 | 9.1 |
| 5 | 325 | 1.38 | 2.65 | 31.9 | 898 | 10.4 |
| 6 | 200 | 1.29 | 2.36 | 19.7 | 911 | 8.6 |
| 7 | 200 | 1.27 | 2.31 | 30.9 | 876 | 8.8 |

†Modulus at 300% Elongation
‡Modulus at 500% Elongation
□Tensile Strength
*Elongation at Break

TABLE IV

VISCOSITY OF SYNTHETIC LATEX

| | Viscosity (cp)‡ Storage Time - Days | | | | |
|---|---|---|---|---|---|
| | 1 | 2 | 3 | 4 | 7 |
| 1 (Control) | 30 | 55 | — | 264 | 260 |
| 2 | 230 | 1390 | 1640 | 1900 | 1800 |
| 3 | 261 | 1480 | 1800 | 1990 | 1800 |
| 4 | 436 | 1770 | 1900 | 2150 | 2150 |
| 5 | 362 | 1770 | 1870 | 2020 | 1920 |
| 6 | 182 | 1350 | 1480 | 1920 | 1770 |
| 7 | 175 | 1320 | 1590 | 1850 | 1900 |

‡Brookfield Viscometer, Spindle No. 2, 12 rpm.

Tensile Strength is defined as the stress at the point of break. Elongation, on the hand, is the point of break during stretch. The Modulus is the ratio of stress divided by elongation or strain. Typically in thin films and goods produced therefrom, the modulus at 300% elongation is important in determining good tactile feeling and reducing fatigue since, under normal use conditions, the film should not undergo high elongation. As a result, the modulus at 300% elongation is generally correlated with wearer comfort.

As illustrated above, the results show that the addition of 2 phr of fumed silica from an aqueous fumed silica dispersion resulted in an increase in tear strength without deleteriously effecting the properties of modulus, tensile and elongation at break. In particular, the improvement in tear strength of the film was significant, especially upon ageing as noted in Table III, whereby the control of sample 1 deceased in tear strength. Table III further illustrates that, as compared to the control, the films of samples 2 through 7 produced in accordance with the present invention also experienced an overall increase in tensile strength and elongation, as well as greater retention of elongation upon ageing. (Note that although all samples decreased in elongation upon ageing, the decrease from the samples produced in accordance with the present invention was not as dramatic).

Table IV illustrates that the fumed silica caused a high degree of thickening to the synthetic latex composition when added at 2 phr, as compared to the control of sample 1. Since, the viscosity the latex composition will control the thickness of a coagulated film, manufacturers of dipped products may need to make adjustments in the dip or dwell time and the coagulant salt concentration to control the film thickness and ensure consistency.

EXAMPLE 2

Similar to the method of preparation set forth in Example 1, three synthetic latex compositions were prepared with the following composition, based on phr (parts per hundred by weight rubber):

| | |
|---|---|
| 60% Baypren T polychloroprene latex[Y] | 167 |
| 10% casein | 2 |
| 50% sulphur | 2 |
| 45% sodium dibutyl dithiocarbamate | 2 |
| 50% zinc oxide | 10 |
| 50% 2246 antioxidant | 2 |
| 33% tetraethylthiuram disulfide | 3 |

[Y]Available from Bayer Aktiengesellschaft, Germany

An aqueous dispersion of fumed silica having a surface area of 100 $m^2/g$ was added to sample 1 of the composition at a concentration of 2.0% based on dry weight while aqueous dispersions of fumed silica having a surface area of 380 $m^2/g$ was added to samples 2 and 3 at a concentration of 2.0% based on dry weight. In addition, sample 2 contained 0.3% DARVAN SMO surfactant (salt of alkyl sulfate) and 0.15% DARVAN WAQ surfactant (salt of alcohol sulfate) by weight based on the fumed silica while sample 3 contained 0.15% DARVAN SMO and 0.075% DARVAN WAQ by weight based on the silica. Table VI illustrates the viscosity of the synthetic latex as determined by Brookfield LVT viscosity measurements taken from one to seven days using a No. 2 spindle at 12 rpm and 60 rpm, 21° C.

TABLE V

VISCOSITY OF SYNTHETIC LATEX

| | Viscosity (cp)‡ Storage Time - Days | | | | | | | |
|---|---|---|---|---|---|---|---|---|
| | 1 | | 2 | | 3 | | 7 | |
| | | | | Spindle Speed | | | | |
| | 12 | 60 | 12 | 60 | 12 | 60 | 12 | 60 |
| 1 | — | 163 | 451 | 185 | 536 | 217 | 696 | 250 |
| 2 | 540 | 267 | 843 | 352 | 985 | 366 | 1080 | 396 |
| 3 | 671 | 294 | 935 | 370 | 1050 | 391 | 1090 | 414 |

‡Brookfield Viscometer, Spindle No. 2, 12 and 20 rpm.

Table V illustrates that the use of a lower surface area fumed silica, as in sample 1, or the addition of a surfactant to samples 2 and 3 containing a higher surface area fumed silica, was particularly useful to maintain the viscosity of the synthetic compositions to a controllable level. In addition, it has been found that the viscosity of the latex compositions may also be reduced with the addition of water to the composition. It is further expected that the use of a surfactant in combination with a lower surface area fumed silica can further be used reduce the viscosity, if needed.

EXAMPLE 3

Similar to the method of preparation set forth in Example 1, four synthetic latex compositions were prepared with the formulation, based on phr (parts per hundred by weight rubber), listed in Table VI.

TABLE VI

| | SAMPLE | | | |
|---|---|---|---|---|
| | 1 | 2 | 3 | 4 |
| DuPont neoprene 671 latex | 172 | 172 | 172 | 172 |
| 10% casein | 2.0 | 2.0 | 2.0 | 2.0 |
| 50% zinc oxide | 10 | 10 | 10 | 10 |
| 50% WSP antioxidant* | 4 | 4 | 4 | 4 |
| 50% thiocarbanilide | 4 | 4 | 4 | 4 |
| Aqueous dispersion of fumed silica (100 m$^2$/g) | — | 5.9 (1 phr) | 8.9 (1.5 phr) | 11.8 (2 phr) |

*o-methylene-bis-phenol antioxidant

From each of the samples, films were dipped after 1, 3 and 7 days of storage, according to the procedure set forth in Example 1. After curing, cooling and stripping from the former, the tear strength of the films were measured at ambient temperature of 23° C. (Table VII) and at an estimated "hot tear" temperature of 60° C. (Table VIII).

TABLE VII

TEAR STRENGTH (N/mm) AT 23° C.

| | Loading level | Storage time (Days) | | |
|---|---|---|---|---|
| Sample | (fumed silica) | 1 | 3 | 7 |
| 1 | 0.0 (Control) | 6.8 | 6.8 | 6.8 |
| 2 | 1.0 | 8.7 | 8.8 | 3.9 |
| 3 | 1.5 | 9.0 | 8.9 | 8.6 |
| 4 | 2.0 | 8.7 | 9.2 | 8.5 |
| glove | 0.0 | 7.1 | 7.1 | 7.1 |

TABLE VIII

TEAR STRENGTH (N/mm) AT 60° C.

| | Loading level | Storage time (Days) | | |
|---|---|---|---|---|
| Sample | (fumed silica) | 1 | 3 | 7 |
| 1 | 0.0(Control) | 1.2 | 1.2 | 1.2 |
| 2 | 1.0 | 3.2 | 3.6 | 3.6 |
| 3 | 1.5 | 3.8 | 3.7 | 3.6 |
| 4 | 2.0 | 3.9 | 3.8 | 3.4 |
| glove | 0.0 | 0.4 | 0.4 | 0.4 |

For comparative purposes, a manufacturer-supplied dipped glove was also obtained in order to determine the tear strength at ambient temperature (23° C.) and the "hot" tear strength at a estimated temperature at 60° C. As noted from Tables VII and VIII, the control and the manufacturer-supplied dipped glove showed reasonable tear strength at ambient temperatures but was severely reduced at the high temperature. All of the synthetic compositions of the present invention containing the aqueous dispersion of fumed silica, on the other hand, demonstrated an increase in tear strength, particularly at the higher temperature. This improvement in hot "tear" strength is significant to reduce the tears in the production process of films and minimize the waste associated therewith.

EXAMPLE 4

Similar to the method of preparation set forth in Example 1, synthetic latex compositions was prepared with the formulation, based on phr (parts per hundred by weight rubber), listed in Table IX.

TABLE IX

| | SAMPLE | | | |
|---|---|---|---|---|
| | 1 | 2 | 3 | 4 |
| DuPont neoprene 671 latex | 172 | 172 | 172 | 172 |
| 10% casein | 2.0 | 2.0 | 2.0 | 2.0 |
| 50% zinc oxide | 10 | 10 | 10 | 10 |
| 50% WSP antioxidant | 4 | 4 | 4 | 4 |
| 50% thiocarbanilide | 4 | 4 | 4 | 4 |
| 17% Aqueous dispersion of fumed silica (100 m$^2$/g) | — | 5.9 (1 phr) | 11.8 (2 phr) | — |
| 17% Aqueous dispersion of fumed silica (100 m$^2$/g) | — | — | — | 5.9 (1 phr) |

The aqueous dispersions of fumed silica were added to samples of the compositions at the concentrations indicated. From each of these three samples, films were dipped, according to the procedure set forth in Example 1, after 1, 3 and 7 days of storage. After curing, cooling and stripping from the former, the tear strength of the films were measured at an ambient temperature of 23° C. and at an estimated "hot tear" temperature of 60° C. (Table X).

TABLE X

| | TEAR STRENGTH (N/mm) | | |
|---|---|---|---|
| Sample | 23° C. | 23° C. (ageing)** | 60° C. |
| 1(Control) | 5.2 | 2.9 | 0.8 |
| 2 | 8.7 | 6.8 | 3.2 |

TABLE X-continued

TEAR STRENGTH (N/mm)

| Sample | 23° C. | 23° C. (ageing)** | 60° C. |
|---|---|---|---|
| 3 | 8.7 | 4.8 | 3.0 |
| 4 | 9.2 | 4.7 | 2.9 |

**Accelerated ageing for 48 hours at 100° C.

Similar to Example 3, Table X shows that the addition of fumed silica provided a significant improvement in tear and "hot tear" strength. In addition, the films exhibited a higher retention of tear upon accelerated ageing.

EXAMPLE 5

Similar to the method of preparation set forth in Example 1, a nitrile synthetic latex compositions was prepared with the formulation listed in Table XI, based on phr (parts per hundred by weight rubber):

TABLE XI

| | SAMPLE | | |
|---|---|---|---|
| | 1 | 2 | 3 |
| 45% Perbunan N VT nitrile latex | 222 | 222 | 222 |
| 62% colloidal sulphur | 2.4 | 2.4 | 2.4 |
| 50% zinc oxide | 3.0 | 3.0 | 3.0 |
| 50% zinc diethyl carbamate (ZDEC) | 1.4 | 1.4 | 1.4 |
| 50% zinc mercaptobenzothiozole (ZMBT) | 1.0 | 1.0 | 1.0 |
| 50% Wingstay L antioxidant | 2.0 | 2.0 | 2.0 |
| 17% aqueous dispersion of fumed silica (380 m²/g) | — | 5.9 (1 phr) | 11.8 (2 phr) |

As noted above, aqueous dispersions of fumed silica were added to samples 2 and 3 at the concentrations indicated. The compositions were matured at room temperature for 16 hours. From each of these three samples, films were prepared by immersing a warmed glass former into a coagulant solution consisting of 45% calcium nitrate in industrial methylated spirit and dipping into the latex composition for 60 seconds. The latex films deposited on the form were dried at 70° C. for 1 hour and then cured at 115° C. for 30 minutes. The films were finally cooled, stripped from the form, and tested for tensile and tear properties using standard ISO techniques, as illustrated in Tables XII, XIII and XIV. Table XV shows the effect of fumed silica on the viscosity of the nitrile synthetic latex and was determined by Brookfield LVT viscosity measurements taken from one to seven days using a No. 1 spindle at 12 rpm, 21° C.

TABLE XII

SYNTHETIC LATEX FILMS

| | M300† (MPa) | M500‡ (MPa) | TS¤ (MPa) | EB* (%) |
|---|---|---|---|---|
| 1 (Control) | 2.57 | 4.96 | 20.9 | 719 |
| 2 | 1.65 | 2.51 | 10.5 | 761 |
| 3 | 2.02 | 3.47 | 19.7 | 776 |

†Modulus at 300% Elongation
‡Modulus at 500% Elongation
¤Tensile Strength
*Elongation at Break

TABLE XIII

AGED (2 days at 100° C.)

| | M300† (MPa) | M500‡ (MPa) | TS¤ (MPa) | EB* (%) |
|---|---|---|---|---|
| 1 (Control) | 3.71 | 9.72 | 21.3 | 598 |
| 2 | 3.37 | 7.73 | 30.7 | 675 |
| 3 | 3.32 | 7.35 | 29.2 | 680 |

†Modulus at 300% Elongation
‡Modulus at 500% Elongation
¤Tensile Strength
*Elongation at Break

TABLE XIV

TEAR STRENGTH (N/mm)

| Sample | 23° C. | 23° C. (ageing)** | 60° C. |
|---|---|---|---|
| 1(Control) | 4.5 | 4.0 | 3.2 |
| 2 | 4.0 | 4.4 | 3.0 |
| 3 | 4.1 | 4.4 | 3.5 |

**Ageing for 48 hours at 100° C.

TABLE XV

VISCOSITY OF SYNTHETIC LATEX

| | Viscosity (cp)‡ Storage Time-Days | | |
|---|---|---|---|
| | 1 | 3 | 10 |
| 1 (Control) | 32 | — | 31 |
| 2 | 43 | 43 | 41 |
| 3 | 47 | 50 | 54 |

‡Brookfield Viscometer, Spindle No. 1, 12 rpm.

Although the effect of the aqueous dispersion of fumed silica in the nitrile latex composition was not as dramatic as in the polychloroprene system, improvement was noted in tensile strength and elongation, particularly upon ageing. In particular, tensile strength improved from 21.3 MPa to 30.7 MPa and 29.2 MPa in samples 2 and 3, respectively. The films also experienced an improvement in tear strength upon ageing, as noted in Table XIV. Furthermore, Table XII and XIII show that the modulus of the films were not negatively affected. Lastly, as noted in Table XV, the addition of an aqueous dispersion of fumed silica did not deleteriously effect the viscosity of the nitrile system.

It is further understood that the present invention is not limited to the particular embodiments shown and described herein, but that various changes and modifications may be made without departing from the scope and spirit of the invention. For example, although the present invention has illustrated the use of fumed silica dispersions for use in certain synthetic rubber latexes, it is believed that other synthetic rubber latexes such butyl rubber, fluorocarbon rubber, polyurethane latex, styrene-butadiene rubber and blends thereof, would also benefit. Similarly, it is contemplated that precipitated silicas meeting the requirements of the present invention would also be suitable.

As noted above, the synthetic latex compositions of the present invention may be useful in a wide variety of articles and, in particular, articles made from thin films, such as surgeons' gloves, examination gloves, industrial gloves, protective gloves, such as household gloves, industrial gloves, electrostatic discharge gloves, catheters, condoms, meteorological weather balloons, toy balloons, foam mattresses and other articles commonly produced with synthetic latex. The compositions may be used to produce the articles themselves, or may used as a layer or coating in combination with natural rubber or other rubber systems.

What is claimed is:

1. A synthetic latex wherein the synthetic latex is apolychloroprene latex composition having a total rubber solids content between about 25% and about 70% comprising: a synthetic latex and fumed silica; wherein said fumed silica is uniformly dispersed in said composition and present in an amount ranging between 0.5% and 2.0% by weight of rubber solids.

2. The composition of claim 1, wherein said synthetic latex has a total rubber solids content between about 25% and about 70%.

3. The composition of claim 1, wherein said fumed silica has a BET surface area ranging from about 50 $m^2/g$ to about 400 $m^2/g$.

4. The composition of claim 3, wherein said fumed silica has a BET surface area ranging from about 100 $m^2/g$.

5. The composition of claim 3, wherein said fumed silica has a BET surface area ranging from about 220 $m^2/g$.

6. The composition of claim 3, wherein said fumed silica has a BET surface area ranging from about 380 $m^2/g$.

7. The composition of claim 1, wherein said fumed silica is an aqueous dispersion of fumed silica.

8. The composition of claim 7, wherein said aqueous dispersion of fumed silica has a pH ranging from about 5.0 to 10.5 and has coagulation characteristics similar to the synthetic rubber latex.

9. The composition of claim 7, wherein said aqueous dispersion of fumed silica has a pH between 8.0 and 10.0.

10. The composition of claim 7, wherein said aqueous dispersion of fumed silica has an initial concentration between 10% and 45% by weight fumed silica solids prior to incorporation into said synthetic latex.

11. The composition of claim 10, wherein said aqueous dispersion of fumed silica has an initial concentration between 12% and 30% by weight fumed silica solids prior to incorporation into said synthetic latex.

12. The composition of claim 7, wherein said aqueous dispersion of fumed silica further comprises a surfactant.

13. The composition of claim 12, wherein said surfactant is an alkyl sulfate salt.

14. The composition of claim 1, wherein said fumed silica is present in an amount ranging from between 0.5% and 3.0% by weight of rubber solids.

15. The composition of claim 14, wherein said fumed silica is about 2.0% by weight of rubber solids.

16. The composition of claim 7, wherein said aqueous dispersion comprises fumed silica having an agglomerate size less than 1.0 micron.

17. The composition of claim 16, wherein said aqueous dispersion comprises fumed silica having an agglomerate size less than 0.5 micron.

18. The composition of claim 1, wherein said composition further comprises at least one additive selected from the group consisting of: curing agents, cross-linking agents, vulcanization activators, vulcanization accelerators, antioxidants, colorants, plasticizers, surfactants, stabilizers and antidegradants.

19. An article comprising: a synthetic latex composition having a total rubber solids content between about 25% and about 70% and fumed silica, wherein the synthetic latex is a polychloroprene latex, and wherein said fumed silica is uniformly dispersed in said latex composition and present in an amount ranging between 0.5% and 2.0% by weight of rubber solids.

20. The article of claim 19, wherein said synthetic latex has a total rubber solids content between about 25% and about 70%.

21. The article of claim 19, wherein said fumed silica has a BET surface area ranging from about 50 $m^2/g$ to about 400 $m^2/g$.

22. The article of claim 21, wherein said fumed silica has a BET surface area ranging from about 100 $m^2/g$.

23. The article of claim 21; wherein said fumed silica has a BET surface area ranging from about 220 $m^2/g$.

24. The article of claim 21, wherein said fumed silica has a BET surface area ranging from about 380 $m^2/g$.

25. The article of claim 19, wherein said fumed silica is an aqueous dispersion of fumed silica.

26. The article of claim 25, wherein said aqueous dispersion of fumed silica has a pH ranging from about 5.0 to 10.5 and has coagulation characteristics similar to the synthetic rubber latex.

27. The article of claim 26, wherein said aqueous dispersion of fumed silica has a pH between 8.0 and 10.0.

28. The article of claim 25, wherein said aqueous dispersion of fumed silica has an initial concentration between 10% and 45% by weight fumed silica solids prior to incorporation into said synthetic latex.

29. The article of claim 28, wherein said aqueous dispersion of fumed silica has an initial concentration between 12% and 30% by weight fumed silica solids prior to incorporation into said synthetic latex.

30. The article of claim 25, wherein said aqueous dispersion of fumed silica further comprises a surfactant.

31. The article of claim 30, wherein said surfactant is an alkyl sulfate salt.

32. The article of claim 25, wherein said dispersion of fumed silica has a pH ranging from about 5.0 to 10.5 and has coagulation characteristics similar to the synthetic rubber latex.

33. The article of claim 32, wherein said dispersion of fumed silica has a pH between 8.0 and 10.0.

34. The article of claim 19, wherein said fumed silica is present in an amount ranging from between 0.5% and 3.0% by weight of rubber solids.

35. The article of claim 34, wherein said fumed silica is about 2.0% by weight of rubber solids.

36. The article of claim 25, wherein said aqueous dispersion comprises fumed silica having an agglomerate size less than 1.0 micron.

37. The article of claim 36, wherein said aqueous dispersion comprises fumed silica having an agglomerate size less than 0.5 micron.

38. The article of claim 19, wherein said composition further comprises at least one additive selected from the group consisting of: curing agents, cross-linking agents, vulcanization activators, vulcanization accelerators, antioxidants, colorants, plasticizers, surfactants, stabilizers and antidegradants.

39. The article of claim 19, wherein said article further comprises a natural rubber latex.

* * * * *